United States Patent [19]

Verzelli et al.

[11] Patent Number: 5,277,462
[45] Date of Patent: Jan. 11, 1994

[54] HIGH-PERFORMANCE CAR BUMPER MODULE

[75] Inventors: Alberto Verzelli; Maurizio Rossi, both of Milan, Italy

[73] Assignee: Centro Sviluppo Settori Impiego S.r.l., Milan, Italy

[21] Appl. No.: 754,259

[22] Filed: Aug. 27, 1991

Related U.S. Application Data

[63] Continuation of Ser. No. 513,103, Apr. 23, 1990, abandoned.

[30] Foreign Application Priority Data

Apr. 24, 1989 [IT] Italy .................... 20268 A/89

[51] Int. Cl.⁵ .............................................. B60R 19/32
[52] U.S. Cl. ................................... 293/134; 293/120; 293/155
[58] Field of Search ............... 293/120, 121, 124, 132, 293/134, 135, 154, 155

[56] References Cited

U.S. PATENT DOCUMENTS

| 1,553,562 | 9/1925 | Short | 293/154 X |
| 3,877,741 | 4/1975 | Wilfert et al. | 293/120 X |
| 4,460,206 | 7/1984 | Peter | 293/120 X |
| 4,533,166 | 8/1985 | Stokes | 293/120 |

FOREIGN PATENT DOCUMENTS 102746 8/1980 Japan .................... 293/120

Primary Examiner—Margaret A. Focarino
Assistant Examiner—Andrew C. Pike
Attorney, Agent, or Firm—Morgan & Finnegan

[57] ABSTRACT

This invention relates to a high performance car bumper module having a covering front piece; a reinforcing element; and a system for controlled and reversible force displacement. The reinforcing element has a bow system which includes a pair of hinges, which are connected to each other with a tie-rod and a pair of hinge-fasteners. The controlled and reversible force displacement system comprises two hydraulic shock absorbers fastened on one end thereof to the bow system through the respective hinge fasteners, wherein each hinge-fastener includes a transverse slot.

8 Claims, 5 Drawing Sheets

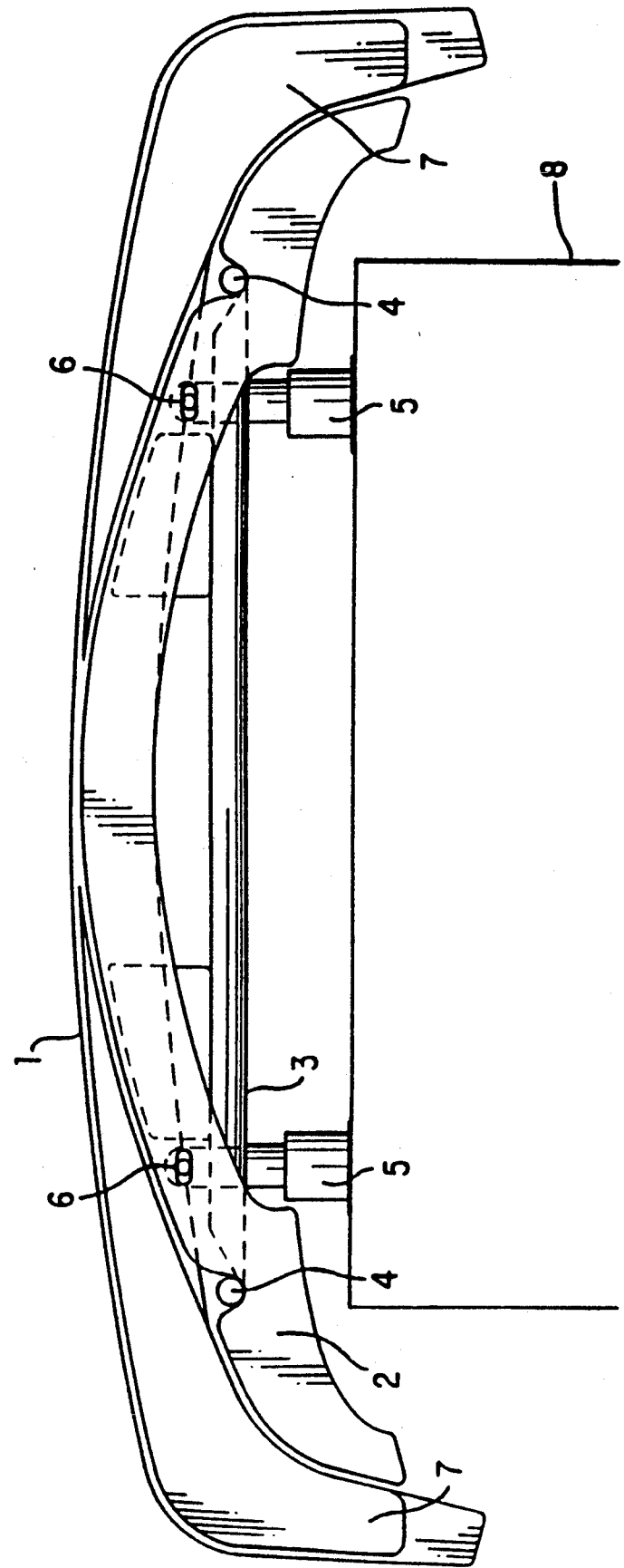

HIGH-PERFORMANCE CAR BUMPER MODULE

This application is a continuation of U.S. application Ser. No. 07/513,103, filed Apr. 23, 1990, now abandoned.

FIELD OF THE INVENTION

The present invention relates to a high-performance car bumper module.

BACKGROUND OF THE INVENTION

"High-performance car bumpers" as used in the instant disclosure and claims are those car bumpers where the increase in theoretical stiffness relative to a normal bumper, with other conditions such as car overhang, fastening means, resistant section (moment of inertia), elastic modulus, and so forth, being the same, varies within the range of from 2.5 to 6 times as great, with a simultaneous decrease in overall tension conditions.

Suitable shock absorbers make possible the absorption of energy by yielding to the shocks in order to avoid adverse effects to the chassis of a car.

Car bumpers exhibit relatively poor performances in Europe where impact speed values are up to 4 km/hour. The performance threshold is normally limited by economic constraints and short shifts allowed for by the bumper before interfering with the frame or other functional parts of the car, such as the radiator. Within these limits, damage to the bumper is also normally allowed.

In North America greater displacements are permitted due to the bumper protruding further from the car than European bumpers. Performances corresponding to impact speeds of 8 km/hour against a front barrier are possible. Normally, under such conditions, shock absorbers are used, e.g., shock absorbers of hydraulic type, in rigid-beam systems where the rigid beam can be protected by energy absorbing materials, such as flexible foam materials. Metal bumpers are included within the category of supporting-beam bumpers. To be able to operate within their range of reversibility (absence of yield or of permanent deformation), metal bumpers require front energy absorbers, of foamed material types with great front displacements, or absorbers installed on brackets by which the bumper structure is anchored to the car, such as hydraulic shock absorbers.

Usually, the maximum value of the force which can be transmitted to the chassis of the car is not reached within the operating range of bumpers, front bumpers in particular. Therefrom, the allowed shifts being the same, the actual impact speed is decreased considerably as compared to the maximum impact speed which can be theoretically achieved.

With the aim of achieving meaningful increase in performance in terms of impact speed, the following remarks can be made regarding energy: if the value of total force which can be transmitted to the structure of the car is fixed each time and other conditions being the same,

- the optimum situation of energy absorption for purposes of reducing the displacements consists of obtaining a rectangular shape of the graph of the force values vs. the displacement values (the variables), i.e., the energy absorption should take place already because the first impact moment, at the maximum allowed force, which is a preset constant. The availability of an infinite stiffness of the system which yields under a constant controlled force is assumed. The system operates within its plastic range.
- The maximum force being the same, the energy stored by a system in the elastic range is represented by a triangular graph of the force values vs. the displacement values (the variables). In this situation, where the surface area (i.e., the energy) is the same and the limits of resistance are typical for the materials used, the displacements are greater than in the previous situation.
- Elastic systems protected by shock absorbers or displaying elasto-plastic phenomena, show lower maximum force values than in the purely elastic situation, where the relevant displacements are consequently greater.

DESCRIPTION OF THE INVENTION

The present invention involves a discovery of a car bumper module which is capable of operating under great stiffness conditions, with a subsequent controlled force displacement at the maximum allowed force, and where a desired stiffness value can be obtained with the structure of the same bumper being subjected to smaller stress values.

Therefore, the object of the present invention is a high-performance car bumper module comprising an aesthetic front piece, a reinforcing element inserted between said front piece and the frame of the car, and means with controlled, reversible force displacement characteristics anchored to the frame and to said reinforcing element.

According to the present invention, the aesthetic front piece is preferably made from a thermoplastic material, and is obtained by techniques of injection molding, a co-injection molding, RIM (reaction injection molding), and so forth. Preferred thermoplastic materials are rubber-modified polypropylene, such as, modified with ethylene-propylene or ethylene-propylene-diene rubbers, polyurethane, and so forth.

The aesthetic front piece has shapes and profiles analogous to those bumpers which are presently used and traded and known to those skilled in the art.

The reinforcing element is preferably constituted by a two-hinged bow system whose bow, as less depressed as possible, is coupled with the internal surface of the aesthetic front piece and has its ends or portions close to its ends, connected with each other by a hinge connection, and a tie-rod system endowed with characteristics of high axial strength and stiffness.

The bow can have a constant cross section or a variable cross section, with a simple outline or, more suitably, with a box section either of integral type or with an applied rear wall. The tie-rod system can be constituted by one or more cylindrical rods, by cables, or by either an open or closed structural shape, thereby capable of resisting bending.

Regarding the materials, the two-hinged bow system can be made from either thermoplastic or thermosetting materials, preferably reinforced with long-fiber reinforcers, e.g., fiberglass. Examples of thermoplastic materials are polypropylene, polyurethane, polyamides, saturated polyester resins, and so forth. Examples of thermosetting materials are unsaturated polyester resins, phenolic resins, epoxy resins, melamine resins, ureic, resorcinol resins, and so forth.

Regarding the tie-rod system, high-strength, high stiffness materials preferably should be used. Examples of these materials are long-fiber reinforced thermoplastic resins, pultruded rods and unidirectional long fibers, made from thermosetting resins, rods or thin sheets of spring steel, cables of steel or of synthetic fibers, and so forth.

The reinforcing element coupled with the aesthetic front piece is fastened to the frame of the car through the means with characteristics of controlled, reversible force displacement.

These latter are generally constituted by two hydraulic shock absorbers, rigidly fastened, on the one side, to the side members of the car, and fastened, on the other side, to the interior of the two-hinged bow system through orientable-hinge fastening means capable of allowing a transverse clearance, so as not to transmit considerable forces in the transverse direction relative to the longitudinal axis of the vehicle. Such transverse forces are borne by the tie-rod system.

The car bumper module can also be inserted in a general system with further sacrifice absorbers or with replacing the reversible absorbers with either total or partial sacrifice elements.

The two-hinged bow system, in particular near the corners of the bumper makes possible suitable integrated absorbers, e.g., flexible foams or foamed materials may be interposed between the aesthetic front piece and the same two-hinged bow structure to withstand angled shocks.

The invention will now be described with reference to the drawings, which are not considered to limit the invention.

BRIEF DESCRIPTION OF THE DRAWINGS

FIG. 3 includes a tie-rod constituted by thin sheets;

FIG. 5 includes a tie-rod constituted by steel cable;

FIGS. 4 and 6 show a cross section of the tie-rod constituted by thin sheets (FIG. 4) and synthetic fiber material (FIG. 6); and FIG. 7 shows a bumper module including a tie rod system fastened to a car.

DETAILED DESCRIPTION OF THE INVENTION

Figure 1:
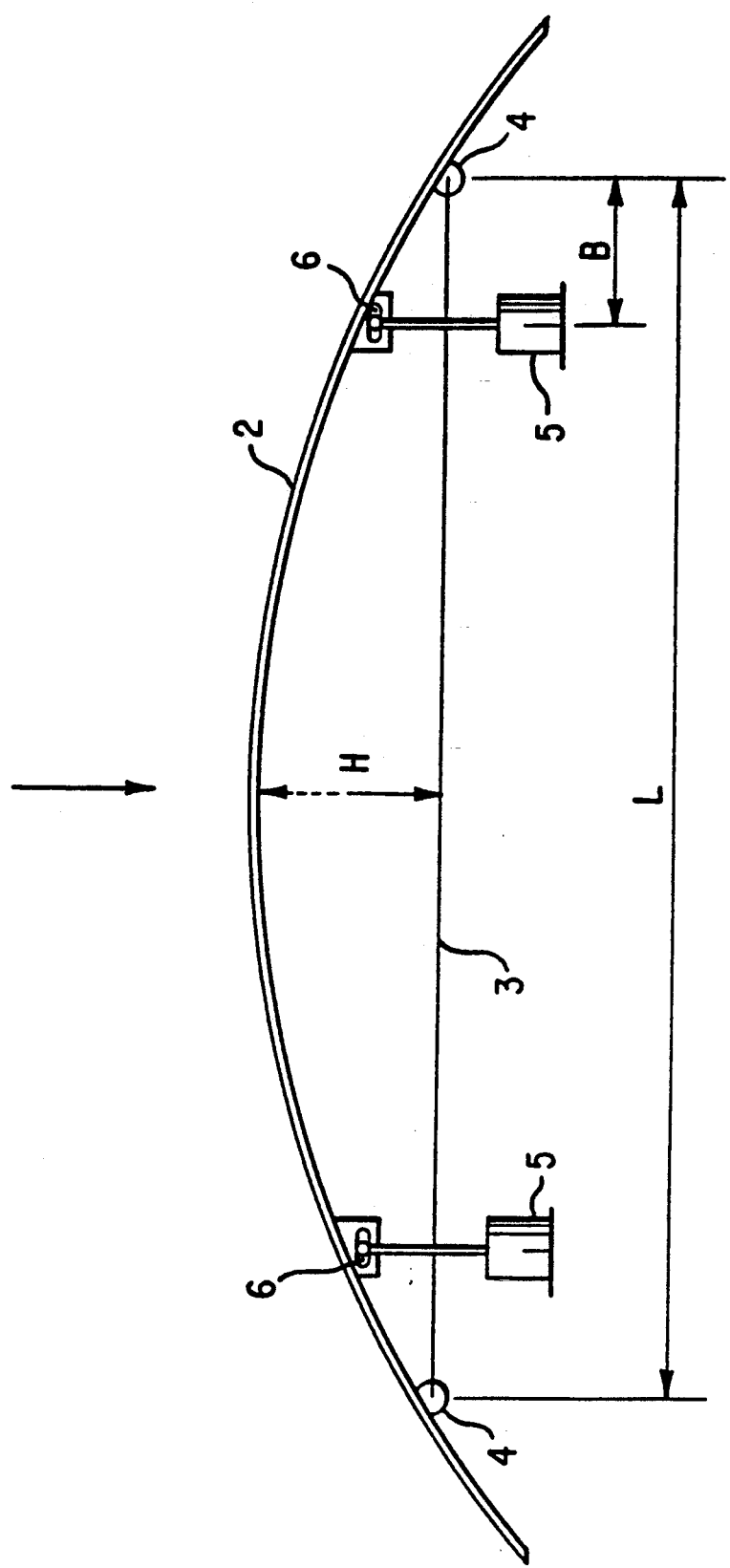
FIG. 1 shows a schematic representation of a two-hinged bow system.
Figure 2:
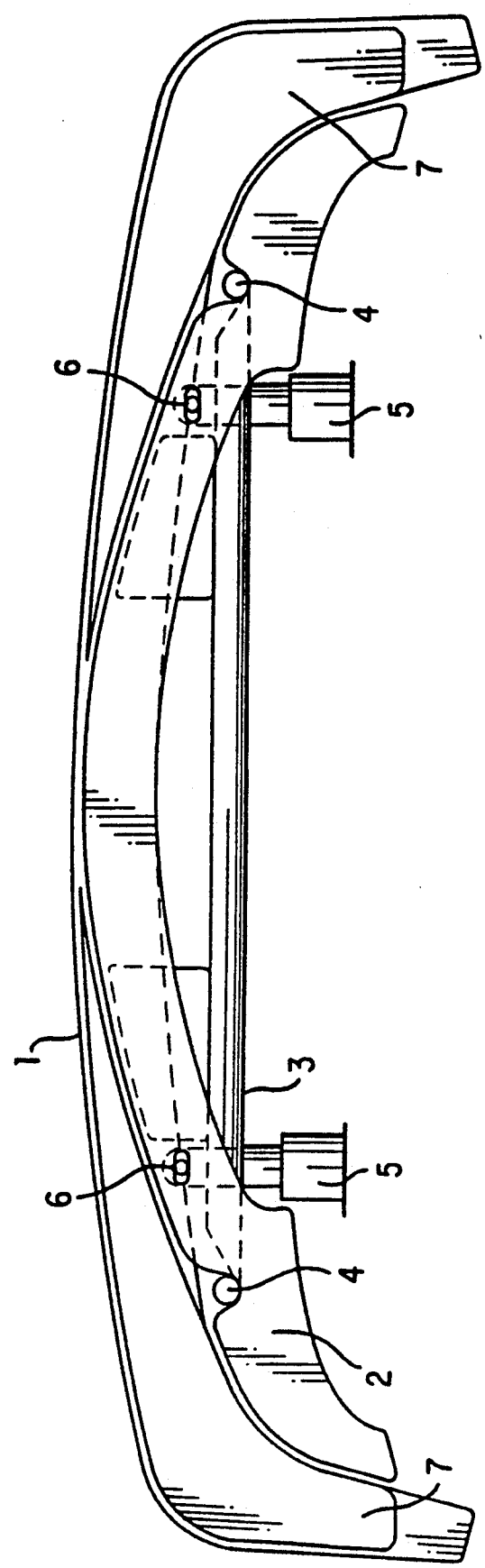
FIG. 2 shows a bumper module including a tie-rod system.
Figure 3:
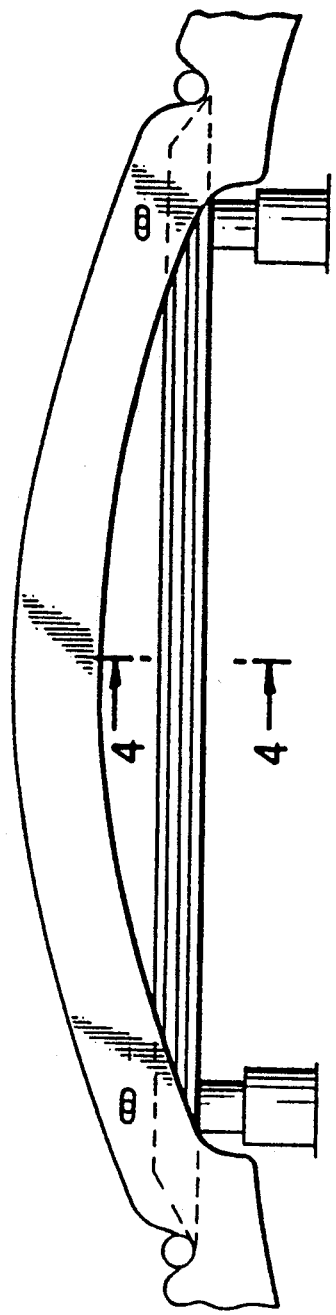
FIGS. 3 and 5 show a two-hinged bow system and means for controlled reversible force displacement.

Referring to FIGS. 1, 2 and 7, common reference numerals correspond to the same elements of the figures. The following description is in reference to FIGS. 1-7. The bumper module comprises the aesthetic front piece (1); reinforcing element constituted by a two-hinged bow system comprising a bow (2) and a tie-rod system (3) connected with the bow by hinges (4); and means for controlled, reversible force displacement (5) fastened on one end thereof to a bearing body of a car (8) and, on another end thereof, to the bow (2) of the two-hinged bow system by the respective hinge fastening means which may be oriented, wherein each hinge fastening means includes a transverse slot (6) capable of allowing transverse clearance.

Near the corners of the bumper, integrated absorbers (7)—e.g., flexible foamed materials—are provided although they are not essential, so that the bumper may withstand angled impacts.

The two-hinged bow system constituted by the bow (2) and the tie-rod (3) connected with the controlled, reversible force displacement means (5) is geometrically set forth in FIG. 1. Clearly the result is that the dimensions and the geometric parameters which characterize the reinforcing element exclusively depend on the shape and dimensions of the car to which the bumper is applied. It has been found that a relationship between the camber (H) of the two-hinged bow system and the length (L) of the tie-rod system, which is capable of enabling the bumper module of the present invention to operate a maximum value of desired stiffness.

In particular, it is found that systems operating where the ratio of H/L is greater than 0.08 and is generally within the range from 0.08 to 0.2, including the extremes, is preferable. And where B is the distance between the point of connection (4) of the tie-rod with the two-hinged bow system and the point of connection (6) of the two-hinged bow system with the yielding means, the ratio of 2 B/L within the range of from 0 to 0.3, including the extremes, is preferable.

The car bumper module according to the present invention can be installed on the car already preassembled (i.e., with the aesthetic front piece (1) and the reinforcing element complete with the means for controlled, reversible force displacement already assembled). See FIG. 2. As an alternative, the reinforcing element—which is fastened to the side beams of the car by the controlled force displacement means—is first assembled on the car and then the aesthetic front piece—fastened to the frame of the car by known anchoring systems such as, e.g., bolts and nuts—is installed.

Figure 4:
Figure 5:
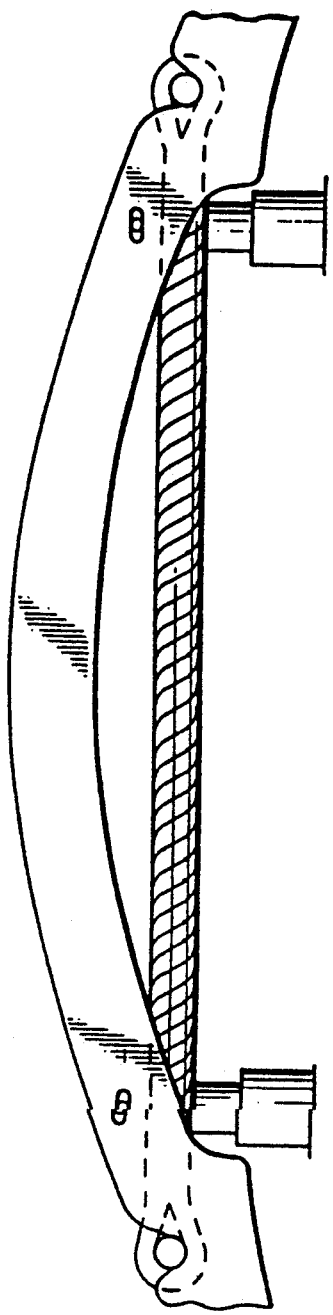

The bow of the two-hinged bow system can have a constant cross-section or a variable cross-section. The tie-rod system can be constituted by at least one cylindrical rod (FIG. 2), cables (FIG. 5), or by either an open structural shape (FIGS. 2, 3, and 5) or closed structural shape (FIG. 7). The tie-rod can be constituted by steel rods (FIG. 2), thin sheets (FIG. 3), steel cables (FIG. 5), or synthetic fiber material (FIG. 6). FIGS. 4 and 6 illustrate a cross-section of the tie-rod constituted by thin sheets (FIG. 4) and synthetic fiber material (FIG. 6).

The bumper module according to the present invention makes possible to obtain stiffness values which are many times greater than those which can be obtained with the traditional beam structure with the other conditions being the same, by suitably adjusting the dimensions of the structure and the tie-rod element, the maximum allowed force can now be reached, with the necessary margins to prevent phenomena of instability of the second order.

With the maximum force being the same, the system, thanks to its geometry, makes possible a lower degree of stress to be applied to the two-hinged bow system than in the beam configuration.

When the maximum force is reached with the corresponding displacement being the minimum, the system, thanks to the intervention of the absorbers under nearly constant force conditions, is capable of dissipating the expected energy by translational motion of the system.

In practice, various changes, modifications and variations can be made to the various parts of the car bumper module shown in the exemplary drawings, within the spirit of the instant invention and without departing from its protection scope.

We claim:

1. High performance car bumper module, for a car, comprising:

a covering front piece having an outer surface and an inner surface;

a reinforcing element comprising bow means coupled to said inner surface, said bow means including a pair of hinges, and a pair of hinge fastening means for fastening the element to the car, said hinges being connected to each other with tie-rod means; and means for controlled and reversible force displacement characteristics comprising two hydraulic shock absorbers rigidly fastened, on one end thereof, to the car and, on another end thereof, to the bow means through the respective hinge fastening means, wherein each hinge fastening means includes a transverse slot.

2. Module according to claim 1, wherein the covering front piece is made from a thermoplastic material.

3. Module according to claim 1, wherein the tie-rod means is constituted by at least one cylindrical rod or cables.

4. Module according to claim 3, wherein the bow means and tie-rod means are both made from a thermoplastic material or from a thermosetting material reinforced with long-fiber reinforcing agents.

5. Module according to claim 1, wherein the tie-rod means is constituted by steel rods, thin sheets, steel cables or synthetic-fiber cables.

6. Module according to claim 1, wherein a ratio H/L, i.e., of a camber (H) of the bow means to a length (L) of the tie-rod means, is greater than 0.08, including extremes.

7. Module according to claim 6, wherein the ratio H/L is within a range from 0.08 to 0.2, including extremes.

8. Module according to claim 1, wherein a ratio 2 B/L is within a range of 0 to 0.3, including extremes, and (B) is a distance between a point of connection of said tie-rod means with said bow means and a point of connection of said bow means with said means for controlled and reversible force displacement.

* * * * *